(12) United States Patent
Hurst et al.

(10) Patent No.: US 8,351,373 B2
(45) Date of Patent: Jan. 8, 2013

(54) METHOD OF CATEGORISING SPEED OF A TERMINAL SYSTEM AND APPARATUS THEREFOR

(75) Inventors: Michael Hurst, Edinburgh (GB); Per Kangru, Uppsala (SE)

(73) Assignee: JDS Uniphase Corporation, Milpitas, CA (US)

( * ) Notice: Subject to any disclaimer, the term of this patent is extended or adjusted under 35 U.S.C. 154(b) by 1163 days.

(21) Appl. No.: 12/202,621

(22) Filed: Sep. 2, 2008

(65) Prior Publication Data
US 2009/0061848 A1    Mar. 5, 2009

(30) Foreign Application Priority Data
Sep. 1, 2007    (GB) .................................. 0717037.6

(51) Int. Cl.
*H04Q 7/20*    (2006.01)
(52) U.S. Cl. ........................................ 370/328; 455/425
(58) Field of Classification Search .................. 370/328
See application file for complete search history.

(56) References Cited

U.S. PATENT DOCUMENTS

| 6,532,432 | B1 | 3/2003 | Nagatsuma et al. |
| 8,195,099 | B2 * | 6/2012 | Bhattad et al. .................. 455/69 |
| 2004/0019454 | A1 | 1/2004 | Peng |
| 2004/0082331 | A1 | 4/2004 | Peng |
| 2005/0025093 | A1 * | 2/2005 | Yun et al. ....................... 370/328 |
| 2012/0069759 | A1 * | 3/2012 | Gummadi et al. ............. 370/252 |

FOREIGN PATENT DOCUMENTS
EP    1014107    1/2002

OTHER PUBLICATIONS
Great Britain Search Report dated Jan. 2, 2008.

* cited by examiner

*Primary Examiner* — Sulaiman Nooristany
(74) *Attorney, Agent, or Firm* — Perman & Green, LLP

(57) ABSTRACT

A method of categorising speed of a terminal (202) in a wireless communications network (116) comprises monitoring a first factor associated with allocation of a radio-frequency (RF) resource that is not related to mobility of the terminal (202). The first factor is then offset against a second factor, the second factor being potentially indicative of mobility of the terminal (202). The speed of the terminal (202) is then approximated using the result of offsetting the first factor against the second factor.

18 Claims, 5 Drawing Sheets

METHOD OF CATEGORISING SPEED OF A TERMINAL SYSTEM AND APPARATUS THEREFOR

This application claims priority from Great Britain Patent Application, No. GB 0717037.6 filed on 1 Sep. 2007, which is incorporated by reference in its entirety.

The present invention relates to a method of categorising a speed of a terminal of the type that, for example, is used to approximate speed of the terminal. The present invention also relates to a terminal speed categorisation apparatus of the type that, for example, is deployed to approximate speed of the terminal. The present invention further relates to a communications system comprising a terminal speed categorisation apparatus of the type that, for example, supports communication between a terminal and an element of a communications network infrastructure.

In the field of wireless communications, services provided by a communications network can become degraded or interrupted due to faults and/or environmental conditions. One known technique used to try to detect quality of service problems is a so-called passive probe technique, where probes are strategically attached via taps to communications links in the communications network and copies of signals traversing the communications links being probed are obtained by the probes for subsequent analysis. However, when a given service, such as a voice service or a data service, is interrupted or degraded below an acceptable level of quality, the problem is sometimes associated with the speed (mobility) of a communications terminal supported by the communications network. In this respect, a number of techniques exist to attempt to determine the speed of the terminal at a given instant in time. However, such techniques are either inaccurate or have a high processing overhead associated with achieving improved accuracy, though such "improved" techniques can still be prone to errors.

Furthermore, the speed of the terminal cannot be easily determined simply by studying the behaviour of the terminal in isolation as functions performed by the network. For example, power control can be attributable to other conditions that are not related to the mobility of the terminal.

According to a first aspect of the present invention, there is provided a method of categorising speed of a terminal supported by a wireless communications network, the method comprising: monitoring a first factor potentially indicative of motion of the terminal; monitoring a second factor associated with allocation of a radio-frequency resource used to support communication between the terminal and an element of a wireless communications network infrastructure, the second factor having a correlation with mobility of the terminal so as to provide a capacity to mitigate a non-mobility influence upon the first factor; offsetting information corresponding to the second factor against information corresponding to the first factor.

The method may further comprise: monitoring the first factor so as to obtain the information corresponding to the first factor.

The method may further comprise: monitoring the second factor so as to obtain the information corresponding to the second factor.

The first information may correspond to the first factor is a measure of motion of the terminal.

The first factor may have a correlation with motion of the terminal.

The method may further comprise: approximating a result of offsetting the information corresponding to the second factor against the information corresponding to the first factor.

The method may further comprise: approximating the result of offsetting by categorising the result of offsetting.

A category defined by a range of values may be provided, the result of the offsetting residing in the range when motion of the terminal is at least statistically probable to correspond to the category.

A plurality of categories including the category may be provided, the plurality of categories respectively corresponding to different ranges of motion of the terminal. The category may be part of a categorisation scheme. The categorisation scheme may be used to categorise speed of the terminal into discrete ranges. The category may correspond to an approximation of the likely speed of the terminal when the result of offsetting corresponds to the category. The category may constitute a statistically probable range of speeds associated with the terminal when the result corresponds to the category.

The method may further comprise: monitoring a third factor also potentially indicative of motion of the terminal; processing the information to the first factor and information corresponding to the third factor in order to obtain combined information potentially indicative of motion of the terminal; and offsetting the information corresponding to the second factor against the combined information.

The method may further comprise: offsetting the information corresponding to the second factor against the information corresponding to the first factor in response to an assessment of the first factor relative to a threshold. The information corresponding to the second factor may be offset against the information corresponding to the first factor by subtracting the information corresponding to the second factor from the information corresponding to the first factor. Alternatively, another mathematical function and/or operator may be employed.

The information corresponding to the first factor may be a mobility score and/or the information corresponding to the second factor may be a non-mobility score.

The method may further comprise: providing a score associated with speed of the terminal; obtaining information weakly correlated with mobility of the terminal or uncorrelated with mobility of the terminal and relevant to the allocation of the radio-frequency resource to support the terminal; and adjusting the score using the information relevant to the allocation of the radio-frequency resource.

The score may be adjusted by generating a refinement score using the information relevant to the allocation of the radio-frequency resource. The information relevant to the allocation of the radio-frequency resource may relate to allocation of the radio-frequency resource from a non-mobility factor.

The first factor may be at least one of: power control; a handover instruction; a change in power requirement; an increase in QoS requirement of a service used; a change in service used; a requirement for increased data download speed; a network-based measurement report; and/or an end-user handset-based measurement report.

The second factor may be at least one of: a connection request; a same cell voice call connection request; a neighbouring cell voice call connection request; a same cell data session connection request; a neighbouring cell data session connection request; an external interference level; use of High Speed Downlink Packet Access (HSDPA) traffic in a same cell; and/or use of HSDPA traffic in a neighbouring cell.

The method may further comprise: monitoring the first and second factors and offsetting the information corresponding to the second factor against the information corresponding to the first factor at a number of points in time in a time window; and verifying substantial consistency between the results of offsetting generated.

The number of points may neighbour or be adjacent a point in time.

The method may further comprise: monitoring the first and second factors repeatedly over a period of time; storing results of offsetting so as to update stored offset data.

The method may further comprise: generating further offset information in respect of another terminal; and using the offset information generated in respect of the terminal in order to weight the further offset information in respect of the another terminal.

The method may further comprise: obtaining additional information concerning an environment of the terminal; and setting the range using the additional information.

The method may further comprise: generating a categorised speed distribution and associating the distribution with a geographical location or area. The additional information may comprise temporal information.

According to a second aspect of the present invention, there is provided a computer program code element comprising computer program code means to make a computer execute the method as set forth above in relation to the first aspect of the invention.

The computer program code element may be embodied on a computer readable medium.

According to a third aspect of the present invention, there is provided a terminal speed categorisation apparatus for categorising a speed of a terminal supported by a wireless communications network, the apparatus comprising: an input arranged to receive information corresponding to a first factor potentially indicative of motion of the terminal and a second factor associated with allocation of an radio-frequency resource used to support, when in use, communication between the terminal and an element of the wireless communications network, the second factor having a weak or no correlation with mobility of the terminal; a processing resource arranged to offset, when in use, the information corresponding to the second factor against the information corresponding to the first factor.

According to a fourth aspect of the present invention, there is provided a wireless communications system capable of supporting communications between a terminal and an element of a communications network infrastructure, the system comprising: a terminal speed categorisation apparatus as set forth above in relation to the third aspect of the invention.

It is thus possible to provide a method of categorising speed of a terminal and an apparatus and system for terminal speed categorisation that are capable of approximating the speed of a terminal so as to generate reliable approximate speed data that can be used for diagnostic purposes. The technique is also sufficiently flexible to be integratable into some existing network analysis systems that are already deployed.

At least one embodiment of the invention will now be described, by way of example only, with reference to the accompanying drawings, in which.

Throughout the following description identical reference numerals will be used to identify like parts.

Figure 1:
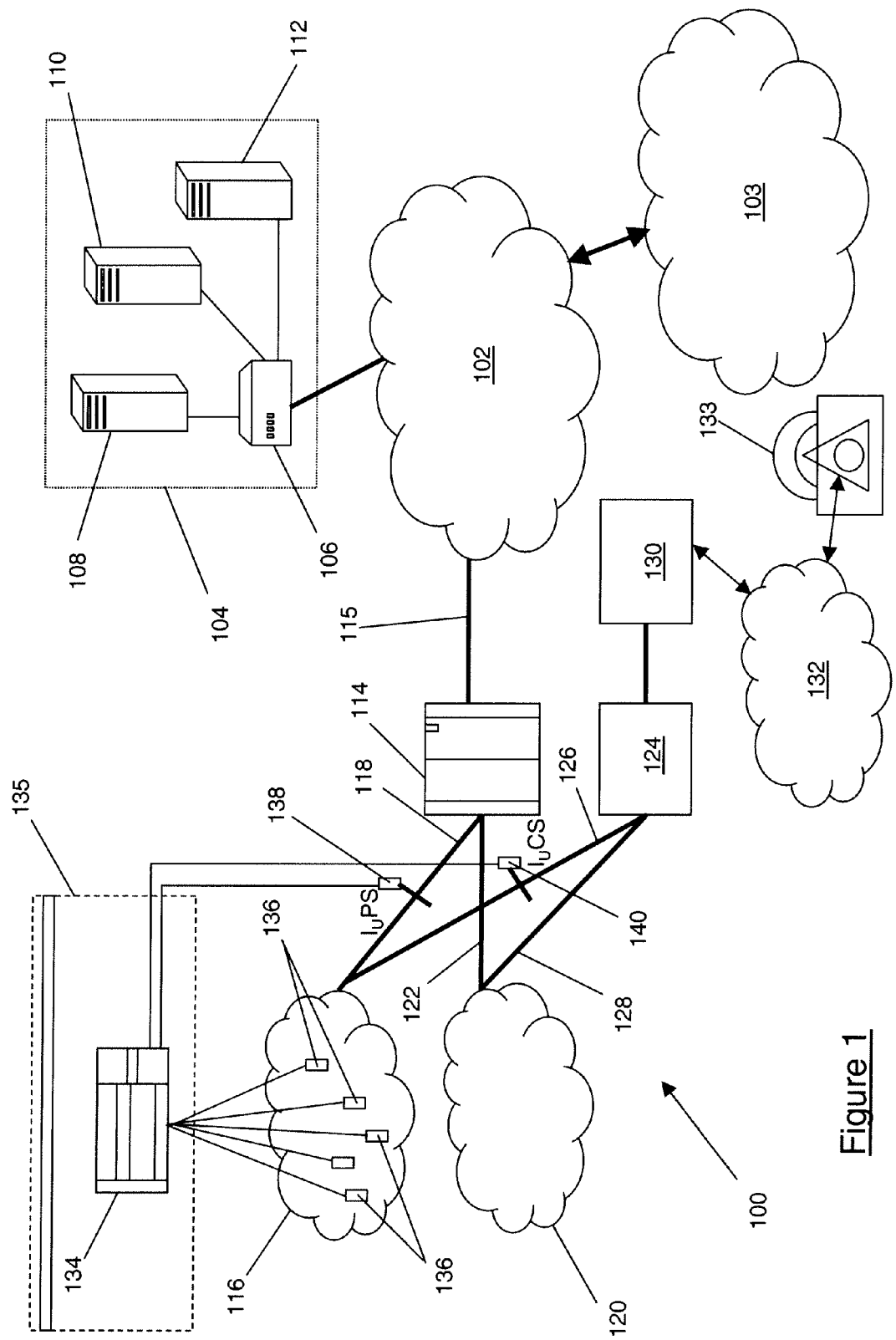
FIG. 1 is a schematic diagram of a part of a communications network.

Referring to FIG. 1, a communications network 100 comprises an Internet Protocol (IP) backbone network 102, for example an Asynchronous Transfer Mode (ATM) or an Ethernet Local Area Network (LAN). The IP backbone network 102 is coupled to a public Internet 103 and Core Network Support Services 104. The Core Network Support Services 104 comprise, for example, a LAN switch 106 coupled to a node (not shown) in the IP backbone network 102, the LAN switch 106 also being coupled to a Domain Name System (DNS) server 110. For completeness, the LAN switch 106 is also coupled to a Remote Authentication Dial-In User Service (RADIUS) server 108 and a Dynamic Host Configuration Protocol (DHCP) server 112.

The IP backbone network 102 is also coupled to a Serving GPRS (General Packet Radio Service) Support Node (SGSN) 114 by a first link 115. In this example, the SGSN 114 is coupled to a UMTS (Universal Mobile Telecommunications System) Terrestrial Access Network (UTRAN) 116 by a second link 118 via a packet switched interface unit, $I_U PS$. The SGSN 114 is also coupled to a GSM/EDGE Radio Access Network (GERAN) 120 by a third link 122. Additionally, the UTRAN 116 and the GERAN 120 are coupled to a Mobile Switching Centre (MSC) 124 by a fourth link 126 and a fifth link 128, respectively, the UTRAN 116 being coupled to the MSC 124 via a circuit switched interface unit, $I_U CS$. The MSC 124 is coupled to a Gateway MSC 130, the Gateway MSC 130 being coupled to a Public Switched Telephone Network (PSTN) 132. Network terminating equipment, for example a telephone handset 133, is also coupled to the PSTN 132.

In order to monitor operation of the UTRAN 116, a probe 134 is coupled to a number of links (not shown in FIG. 1) in the UTRAN 116 by a corresponding number of strategically located taps 136. Additionally, in order to monitor communications between the UTRAN 116 and the SGSN 114, a first further tap 138 is deployed at the packet-switched interface unit $I_U PS$, and a second further tap 140 is deployed at the circuit-switched interface unit $I_U CS$ in order to monitor communications between the UTRAN 116 and the MSC 124.

Figure 2:
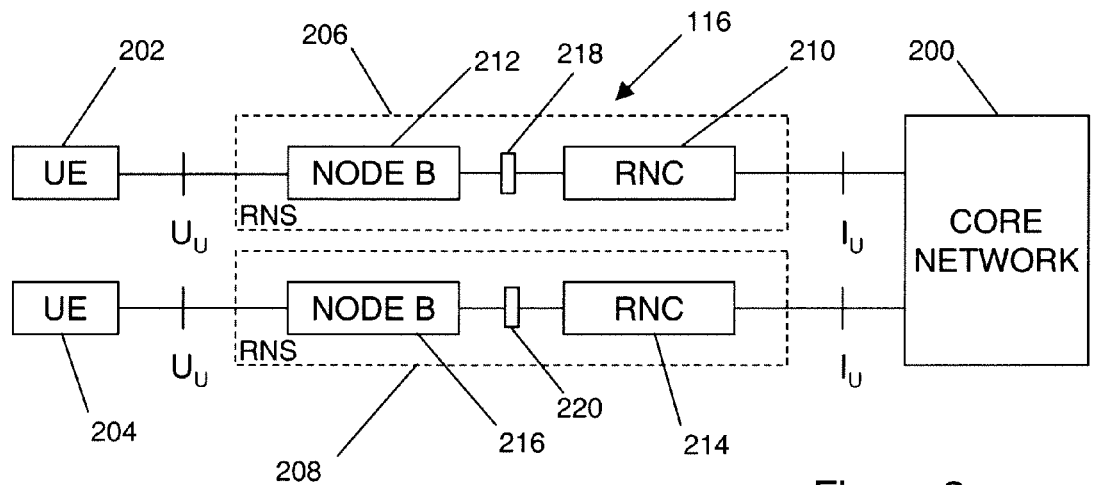
FIG. 2 is a schematic diagram of a Universal Mobile Telecommunications System (UMTS) Terrestrial Radio Access Network (UTRAN) in greater detail.

As mentioned above, the UTRAN 116 is coupled to the IP backbone network 102 via the SGSN 114, the IP backbone network 102, the SGSN 114 and (in this example) the MSC 124 constituting a part of a core network 200 (FIG. 2).

Referring to FIG. 2, the core network 200 communicates with the UTRAN 116 via a first interface, $I_U$. A first User Equipment (UE) unit 202 and a second UE unit 204 are capable of communicating with the core network 200 via the UTRAN 116. The first and second UE units 202, 204 are capable of communicating with the UTRAN 116 via a Radio Frequency (RF) interface, $U_U$.

The core network 200, the UTRAN 116 and the first and second UE units 202, 204 provide an access stratum (not shown) and a non-access stratus (not shown).

The UTRAN 116 comprises a first Radio Network Subsystem (RNS) 206 and a second RNS 208, the first and second RNSs 206, 208 being capable of communicating with the core network 200. The first RNS 206 is also capable of communicating with the first UE unit 202, the second RNS 208 being capable of communicating with the second UE unit 204.

The first RNS 206 comprises a first Radio Network Controller (RNC) 210 capable of communicating with the core network 200 and coupled to a first Node B 212, the first Node B 212 being capable of communicating with the first UE unit 202. The second RNS 208 comprises a second RNC 214 capable of communicating with the core network 200 and coupled to a second Node B 216, the second Node B 216 being capable of communicating with the second UE unit 204.

The first and second UE units 202, 204 are, in this example, multimedia mobile terminals capable of supporting voice and/or data communication services, for example a Short Messaging Service (SMS), a Multimedia Messaging Service (MMS), a web access service, and/or sending e-mail. Of course, other terminal configurations can be employed, for example a mobile terminal that only supports voice services or voice services and basic data services, or a mobile terminal coupled to a mobile computing device, such as a laptop computer or a Personal Digital Assistant (PDA). Alternatively, one or both of the UE units 202, 204 can be any other type of terminal capable of operating in accordance with the UMTS standard and supporting voice and/or data services.

As mentioned above, the probe 134 is coupled to the UTRAN 116 by the corresponding number of strategically located taps 136. In this respect, a first UTRAN tap 218 is operably coupled to a first link between the first RNC 210 and the first Node B 212, and a second UTRAN tap 220 is operably coupled to a second link between the second RNC 214 and the second Node B 216.

Figure 3:
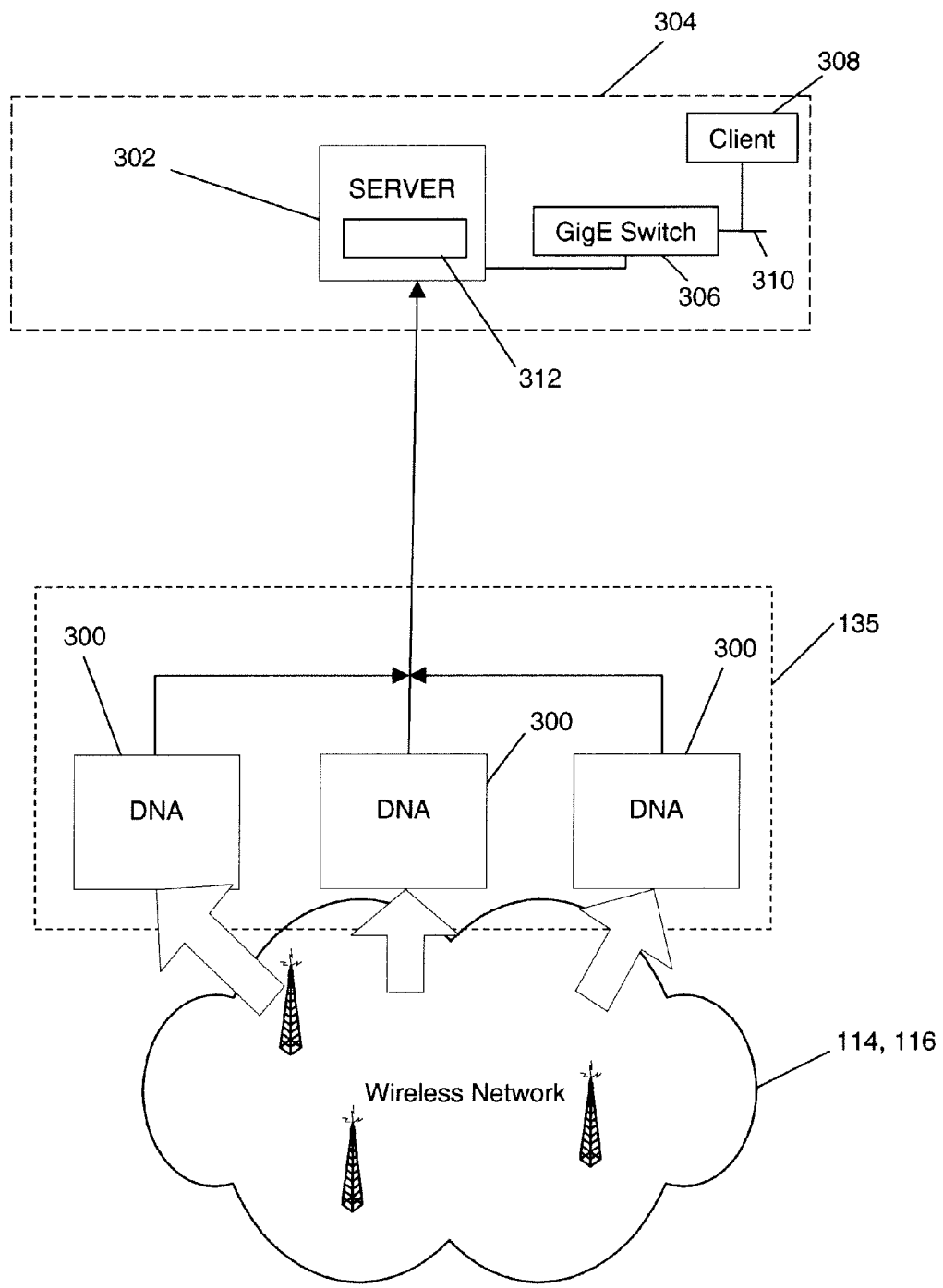
FIG. 3 is a schematic diagram of data flow in the communications network of FIG. 1.

Referring back to FIG. 1, the probe 134 is a schematic representation for the sake of simplicity and clarity of description. In this example, taps are respectively coupled to a number of distributed network analyser probes that are part of a Distributed Network Analyser (DNA) system 135 supplied by Agilent Technologies, Inc. that monitors performance at predetermined points in the communications network 100. In this example, the predetermined points are the points of connection of the number of taps 136. Referring to FIG. 3, the distributed network analyser probes 300 are, in this example, coupled to a multi-user server 302 located at an Operational Support Systems (OSS) centre 304. The server 302 is coupled to a Gigabit Ethernet switch 306 so that the server 302 is accessible by one or more client analysis terminals 308 via a Local Area Network (LAN) 310. In this example, the client analysis terminal 308 is a Personal Computer (PC) coupled to the LAN 310 via a suitable interface card (not shown), the client analysis terminal 308 executing analysis software that instantiates a mobility processor module 312 so as to provide the Distributed Network Analyser system 135 with functionality as described later herein.

Figure 4:
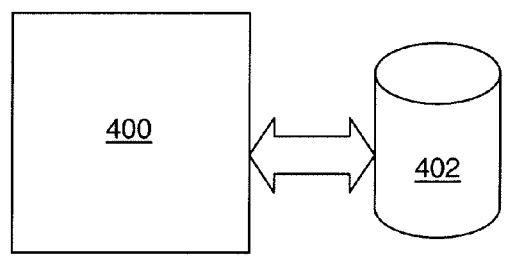
FIG. 4 is a schematic diagram of an apparatus constituting an embodiment of the invention.

Turning to FIG. 4, the client analysis terminal 308 comprises a processing resource, for example a microprocessor 400, coupled to a storage device, for example, a hard disc drive, constituting a data store 402.

In this example, the Distributed Network Analyser system 135 is configured to categorise the speed of UEs as one of three categories depending upon speed of a given UE: stationary, pedestrian, high-speed.

Figure 5:
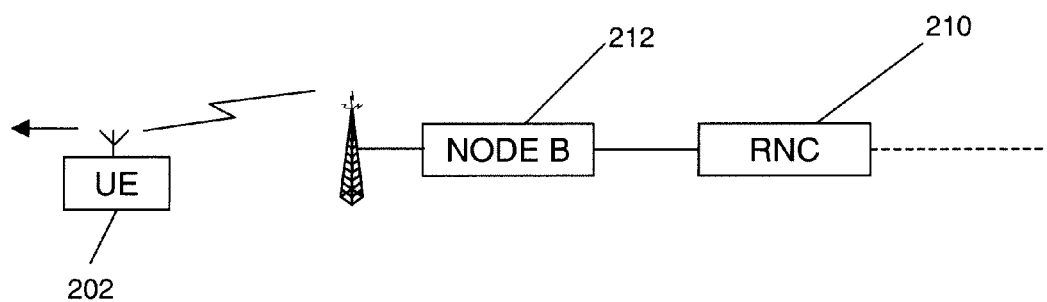
FIG. 5 is a schematic diagram of a part of the UTRAN of FIG. 2 and a first terminal in another embodiment of the invention.

Turning to FIG. 5, the first UE 202 is capable of discovering, attaching to and transmitting on common channels of the first Node B 212 using standardised methods specified by the Third Generation Partnership Project (3GPP). Following initial registration with the first Node B 212, and based upon setup and modification of Dedicated and Common Transport channels, communication between the first UE 202 and the first Node B 212, via the radio-frequency resource 500 allocated, can take place, the first Node B 212 constituting an element of the infrastructure of the UTRAN 116 and the UTRAN 116 constituting a part of a wireless communications network. The wireless communications network also comprises, in this example, the SGSN 114 and the MSC 124.

In this example, the first UE 202 is participating in a voice call whilst moving away from the Node B 212. Consequently, the first RNC 210 increases output power provided by the Node B 212 using a power control signalling message, for example an Outer Loop Power Control message or an Inner Loop Power Control message, in order to meet QoS requirements for the voice call. Subsequently, the voice call is "dropped" as the first UE 202 moves further away from the first Node B 212 and experiences environmental conditions that, in this example, cause the voice call to be dropped. Alternatively, the voice call is not dropped, but handed over to a neighbouring Node B, for example the second Node B 216.

Figure 7:
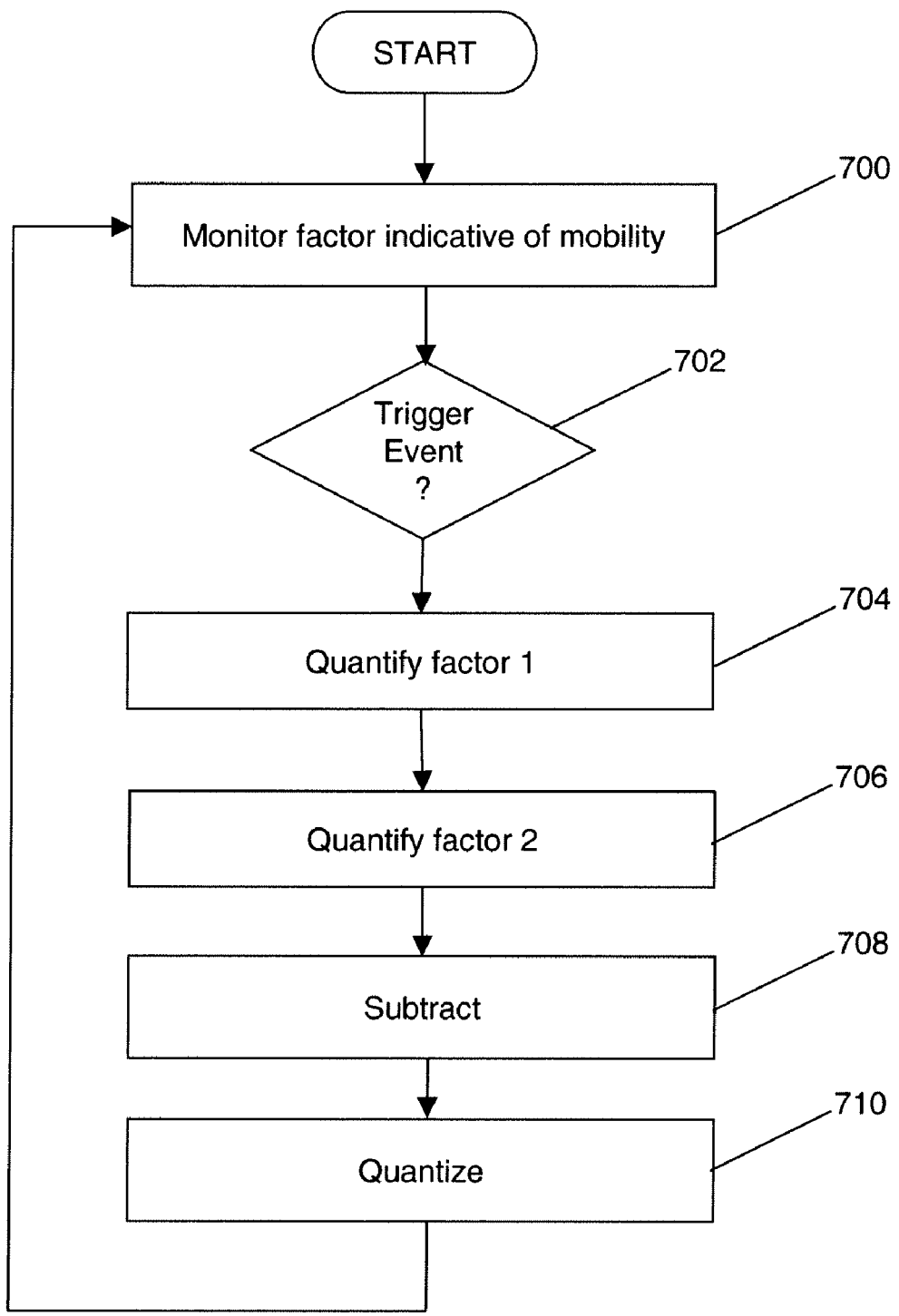
FIG. 7 is a flow diagram for use with the apparatus of FIG. 4.

In operation (FIG. 7), the Distributed Network Analyser system 135, in particular in this example, the server 302 in conjunction with the distributed network analysis probes 300, monitors (Step 700) messages passing the points in the wireless communications network respectively coupled to the distributed network analysis probes 300. At a first time, t, the mobility processor 312 monitors (Step 700) information carried by one of more of the messages that are potentially indicative of motion of the first UE 202.

In relation to the motion of a terminal, a number of factors are potentially indicative of motion, for example one or more factors relating to the allocation of the RF resource 500, the one or more factors affecting the allocation. For example, a change in power control alters allocation of the RF resource 500. Other factors exist and can alternatively or additionally be employed, for example: initiation of a handover command; a change in power requirement; an increase in QoS requirement of a service used; a change in service used, such as a requirement for increased data download speed; a result of a network based measurement report and/or a result of an end-user handset based measurement report. Indeed, the factor need not only concern the allocation of the RF resource 500 and can relate to other non-RF considerations that can, for example cause interference, for example geographical or structural factors. In this example, one of the above factors is used as a trigger to initiate processing in relation to one or more factors in order to determine a mobility score. The skilled person will, however, appreciate that more than one factor can be employed as the trigger, i.e. the processing is initiated when more than one factor satisfies respective more than one criterion.

Once the trigger has occurred (Step 702), the mobility processor 312 generates (Step 704) a mobility score, $S_m$, using the factor that was used as the trigger, for example by cross-referencing a value of the factor against a look-up table of factor values and mobility scores. Alternatively, a function can be employed having the factor value as an input and the mobility score as an output. Of course, if desired, values of more than one factor can be used to generate the mobility score, $S_m$.

In isolation, the one or more factors are only potentially indicative of mobility. It is therefore necessary to analyse at least one other factor that does not relate to mobility in order to generate a non-mobility score, $S_m$, to offset against the mobility score, $S_m$. In this example, the mobility processor 312 monitors connection requests, though other factors can additionally or alternatively be used to generate (Step 706)

the non-mobility score, $S_{nm}$, for example: a same cell voice call connection request, a neighbouring cell voice call connection request, a same cell data session connection request, a neighbouring cell data session connection request, an external interference level, use of High Speed Downlink Packet Access (HSDPA) traffic in a same cell, and/or use of HSDPA traffic in a neighbouring cell. As with the factor used to generate the mobility score, $S_m$, the second factor need not only concern the allocation of the RF resource 500 and can relate to other non-RF considerations that can, for example cause interference, for example geographical or structural factors.

Hence, it can be seen that a second factor associated with allocation of the RF resource 500 that is not related to the mobility of the terminal, in this example the first UE 202, is offset against a first factor potentially indicative of mobility of the terminal. By quantifying the first and second factors in, in this example, a dimensionless manner, such as a "score", an indication of degree of speed can be determined.

The non-mobility score, $S_{nm}$, is then subtracted (Step 708) from the mobility score, $S_m$, in order to arrive at an offset or overall score, S. However, the offset score, S, is not a precise measure of speed of the terminal and so can only be used to provide an approximation of speed of the terminal within bands or ranges of a categorisation scheme. Consequently, the mobility processor 312 employs thresholds to categorise (Step 710) the speed of the terminal, for example as set out in Table I below.

TABLE I

| Score range | Mobility Category |
| --- | --- |
| a → b | Stationary |
| b → c | Pedestrian |
| c → d | High speed |

The above Table I is implemented as a look-up table. However, logic can be employed to provide the categorisation function. The above categorisation is a type of quantisation.

The limits of the ranges a, b, c, d are customised to take into account variations in the information carried by the one or more messages analysed by the Distributed Network Analyser system 135 due to differences in hardware employed to support the UTRAN 116, SGSN 114 and the MSC 124. In this respect, manufacturer-dependent variations exist and account needs to be taken for such variations to maintain reliability of results.

The offset score, S, calculated above constitutes, in this example, a first offset score, $S_1$, that is stored in the data store 402 and the above process (Steps 700 to 710) is repeated at a second, subsequent, point in time, $t_2$, and a second offset score, $S_2$, is also stored in the data store 402. At a third, subsequent to the second, point in time, $t_3$, the above process is repeated (Steps 700 to 710) and a third offset score, $S_3$, is stored in the data store 402. In this example, a cluster of three measurements are taken, effectively about the second point in time, $t_2$, in order to ensure consistency of results, i.e. $t_2 \pm \Delta t$. Hence, the first, second and third offset scores, $S_1$, $S_2$, $S_3$, are compared for approximate consistency both in quantum and/or subsequent corresponding categorisation.

In order to reinforce the notion that the first factor is only potentially indicative of motion of the terminal and how such ambiguity can be handled, in another example (FIG. 6), the first UE resides in a cell supported by the first Node B 212, and the second UE 204 has moved into the cell supported by the first Node B 212. The second UE 204 is supported by the first Node B 212, because a handover has taken place from the second Node B 216 to the first Node B 212. Consequently, both the first and second UEs 202, 204 are supported by the first Node B 212. Additionally, the first and second UEs 202, 204 are each participating in respective first and second voice calls.

After a period of time, the duration of which is unimportant for the purposes of this example, the second voice call involving the second UE 204 finishes. Consequently, the first RNC 210 instructs the first Node B 212 to reduce downlink power in order to minimise interference levels in the cell supported by the first Node B 212 whilst maintaining the QoS requirement for the first voice call in the network. Analogously, if voice calls are initiated by other UEs supported by the first Node B 212, the first RNC 210 would instruct the first Node B 212 to increase downlink power in order to reduce downlink Signal-to-Noise Ratio (SNR) in order to maintain the QoS requirement for the voice calls in progress.

It can be appreciated that the change in the downlink power of the first Node B 212 can be interpreted as necessitated as a result of mobility of a terminal towards or away from the first Node B 212 as was the case in the previous example. However, the change in the downlink power can equally be attributable to an increase or decrease in the number of voice calls supported by the first Node B 212. Hence, the change in the output power of the first Node B 212 is not conclusive of the occurrence of mobility but only potentially indicative of mobility.

It is therefore necessary to temper the significance of this factor by offsetting against the factor, one or more factors associated with allocation of the RF resource and that do not change with mobility of the terminal 202. Indeed, in all of the above examples, the second factor has a correlation with mobility of the terminal 202 so as to provide a capacity to mitigate a non-mobility influence upon the first factor, the non-mobility influence contributing, in this example, to the mobility score, $S_m$. The correlation between the second factor and the mobility of the terminal 202 can be no correlation or a "weak" correlation. In this respect, consideration of a given factor as "weak" is in the context of a surrounding environment. The degree of weakness of correlation can be expressed as a proportion of correlation of the first factor with mobility of the terminal 202, for example the correlation of the second factor with the mobility of the terminal 202 can be less than one tenth of the correlation of the first factor with the mobility of the terminal 202, such as less than one fifteenth of the correlation of the first factor with the mobility of the terminal 202 or less than one twenty-fifth of the correlation of the first factor with the mobility of the terminal 202.

Figure 6:
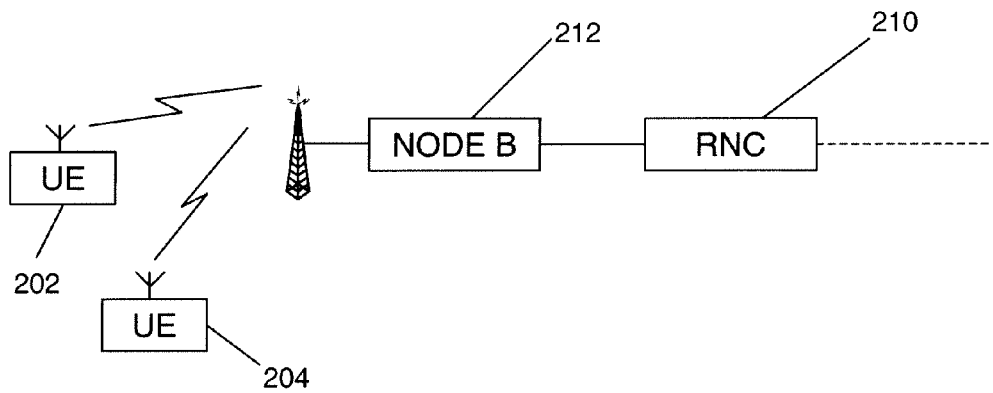
FIG. 6 is a schematic diagram of the part of the UTRAN of FIG. 5, the first terminal and a second terminal in a further embodiment of the invention.

As can be seen from FIG. 6, due to the presence of the second UE 204, variation of the first factor can be due to reasons that are uncorrelated with terminal mobility. Consequently, the first factor is monitored and, as explained in the previous example, quantified by generation of the mobility score, $S_m$. The non-mobility score, 5 nm, is then also generated in order to quantify the second factor. Subsequently, the second factor is offset against the first factor by subtraction of the non-mobility score, $S_{nm}$, from the mobility score, $S_m$.

The offset score, S, calculated is then stored in the data store 402. The offset score, S, is also approximated using the categorisation technique described above in relation to the previous example. The category selected is also stored in the data store 402.

In a like manner to that described in relation to the previous example, the above technique (Steps 700 to 710) is repeated at a number of instances in time so as to obtain, for example, offset scores for a given time, t, of interest as well as at $t \pm \Delta t$.

In this example, categorisation of the mobility of the terminal is repeated periodically as the mobility of the terminal can change over time.

Whilst in the above examples, reference is made to categorisation of the mobility of the first UE 202, the skilled person will appreciate that other terminals operate within the network for which mobility can be categorised.

In a further embodiment, additional information available to the Distributed Network Analyser system 135 can be employed in order to configure parameters, for example, upper and lower limits of the ranges associated with the categories. In this respect, it can be possible to configure one or more categories.

In this example, the distributed network analyser system 135 has been provided with additional information concerning a location of the first Node B 212. In this respect, the location of the first Node B 212 is close to a junction where a number of arterial roads intersect and that is prone to automobile congestion at certain times of the day. Hence, if it is known that the automobiles and hence the terminals located respectively in the automobile move at a pedestrian speed, for example less than 10 kph but are not typically stationary between the hours of 7:00 am and 9:00 am. The server 302 can generate offset scores, S, for terminals supported by the first Node B 212 during this period. The offset scores, S, obtained are then statistically analysed and the results of the analysis, for example a statistical distribution, is used to identify a range of offset scores that correspond to the pedestrian category. Hence, the distributed network analyser system 135 is "aware" that during the hours of 7:00 am and 9:00 am, scores falling within the range of offset scores identified are most likely to correspond to terminal motion at a pedestrian speed. In this example, the statistical distribution is a Gaussian-type distribution, for example a Poisson distribution or a Binomial distribution, and the statistical distribution is used to identify the range. For example, a number of standard deviations about a mean value of the distribution can be used to derive the range or values below a number of standard deviations that is itself above or below the mean value can be taken. In this respect, the skilled person will appreciate that the exact statistical measure, for example standard deviation, to derive a limit of the range can vary and can depending upon the application, for example variance can be used.

Of course, the above technique can be used for locations at times when terminals are moving at high speed, for example between 10:00 pm and 4:00 am at the above-mentioned junction served by the first Node B 212. It will therefore be appreciated that other information can be used to assist in the determination of categorisation of ranges of scores, for example train timetable information or knowledge that a certain geographical area is a commuter area.

By accumulating mobility data relating to terminals served by a given Node B, additional useful information is available to network operators for diagnostic purposes, as well as to network planners.

In a further embodiment, offset information generated in respect of the first UE 202 is used to weight offset information in respect of the second UE 204. For example, a first offset score is calculated in respect of the first UE 202 that is, in this example, mobile and a second offset score is calculated in respect of the second UE 204 that is, in this example, stationary. The first offset score is used to weight the second offset score, because the mobility of the first UE 202 influences, in this example, power control associated with the second UE 204. Consequently, unless weighted, the second offset score can become distorted and provide an incorrect indication as to the true nature of the mobility of the second UE 204, which in this example is actually stationary.

The above examples have been described in the context of a UMTS network. However, the skilled person will appreciate that the above-described techniques are applicable to other types of wireless communications network, for example: the GERAN 120, CDMAOne, CDMA 2000, and GPRS.

Although in the above-described examples, the categorisation of the speed of the terminal takes place at the server 302, the skilled person will appreciate that such a determination and the processing required to reach such a determination can be performed other than in the server 302, for example in the client analysis terminal 308 or distributed, for example between the client analysis terminal 308 and the server 302, the individual or combined processing capability of the client analysis terminal 308 and the server 302 constituting a processing resource.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

The invention claimed is:

1. A method of categorizing speed of a terminal supported by a wireless communications network, the method comprising:
   monitoring a first factor potentially indicative of motion of the terminal;
   monitoring a second factor associated with allocation of a radio-frequency resource used to support communication between the terminal and an element of a wireless communications network infrastructure, the second factor having a correlation with mobility of the terminal so as to provide a capacity to mitigate a non-mobility influence upon the first factor;
   determining a difference by offsetting information corresponding to the second factor against information corresponding to the first factor; and
   approximating a result of offsetting the information corresponding to the second factor against the information corresponding to the first factor by assigning the result to a category defined by a range of values, having at least a statistical probability of corresponding to the motion of the terminal.

2. A method as claimed in claim 1, further comprising:
   monitoring the first factor so as to obtain the information corresponding to the first factor.

3. A method as claimed in claim 1, further comprising:
   monitoring the second factor so as to obtain the information corresponding to the second factor.

4. A method as claimed in claim 2, wherein the first information corresponding to the first factor is a measure of motion of the terminal.

5. A method as claimed in claim 1, further comprising a plurality of categories including the category, the plurality of categories respectively corresponding to different ranges of motion of the terminal.

6. A method as claimed in claim 1, further comprising:
   monitoring a third factor also potentially indicative of motion of the terminal;

processing the information to the first factor and information corresponding to the third factor in order to obtain combined information potentially indicative of motion of the terminal; and offsetting the information corresponding to the second factor against the combined information.

7. A method as claimed in claim 1, further comprising:

offsetting the information corresponding to the second factor against the information corresponding to the first factor in response to an assessment of the first factor relative to a threshold.

8. A method as claimed in claim 1, wherein the information corresponding to the first factor is a mobility score and/or the information corresponding to the second factor is a non-mobility score.

9. A method as claimed in claim 1, further comprising:

providing a score associated with speed of the terminal;

obtaining information weakly correlated with mobility of the terminal or uncorrelated with mobility of the terminal and relevant to the allocation of the radio-frequency resource to support the terminal; and adjusting the score using the information relevant to the allocation of the radio-frequency resource.

10. A method as claimed in claim 1, wherein the first factor is at least one of:

power control;

a handover instruction;

a change in power requirement;

an increase in QoS requirement of a service used;

a change in service used;

a requirement for increased data download speed;

a network-based measurement report; and/or an end-user handset-based measurement report.

11. A method as claimed in claim 1, wherein the second factor is at least one of:

a connection request;

a same cell voice call connection request;

a neighbouring cell voice call connection request;

a same cell data session connection request;

a neighbouring cell data session connection request;

an external interference level;

use of High Speed Downlink Packet Access (HSDPA) traffic in a same cell; and/or use of HSDPA traffic in a neighbouring cell.

12. A method as claimed in claim 1, further comprising:

monitoring the first and second factors and offsetting the information corresponding to the second factor against the information corresponding to the first factor at a number of points in time in a time window; and verifying substantial consistency between the results of offsetting generated.

13. A method as claimed in claim 1, further comprising:

monitoring the first and second factors repeatedly over a period of time;

storing results of offsetting so as to update stored offset data.

14. A method as claimed in claim 1, further comprising:

generating further offset information in respect of another terminal; and using the offset information generated in respect of the terminal in order to weight the further offset information in respect of the another terminal.

15. A method as claimed in claim 1, further comprising:

obtaining additional information concerning an environment of the terminal; and setting the range using the additional information.

16. A non-transitory computer readable storage medium comprising a computer program element including computer program code means to make a computer execute the method as claimed in claim 1.

17. A terminal speed categorization apparatus comprising:

an input arranged to receive information corresponding to a first factor potentially indicative of motion of the terminal and a second factor associated with allocation of an radio-frequency resource used to support, when in use, communication between the terminal and an element of the wireless communications network, the second factor having a weak or no correlation with mobility of the terminal;

at least one processor and at least one memory including computer program code, the at least one memory and the computer code, configured to, with that at least one processor, cause the apparatus to:

determine a difference to offset, when in use, the information corresponding to the second factor against the information corresponding to the first factor; and approximate a result of the offset of the information corresponding to the second factor against the information corresponding to the first factor by assigning the result of the offset to a category defined by a range of values, having at least a statistical probability of corresponding to the motion of the terminal.

18. A wireless communications system supporting communications between a terminal and an element of a communications network infrastructure, the system comprising:

a terminal speed categorization apparatus as claimed in claim 17.

* * * * *